(12) United States Patent
Frazier

(10) Patent No.: US 7,395,164 B1
(45) Date of Patent: Jul. 1, 2008

(54) EXPONENTIAL SMOOTHING OF APERIODICALLY MEASURED VALUES WITH STALENESS REPORTING

(75) Inventor: Peter Frazier, Princeton, NJ (US)

(73) Assignee: Teradata , US Inc., Miamisburg, OH (US)

( * ) Notice: Subject to any disclaimer, the term of this patent is extended or adjusted under 35 U.S.C. 154(b) by 0 days.

(21) Appl. No.: 11/614,478

(22) Filed: Dec. 21, 2006

(51) Int. Cl.
*G01R 29/02* (2006.01)
*G06F 19/00* (2006.01)

(52) U.S. Cl. ..................................................... 702/79
(58) Field of Classification Search ................ 702/79
See application file for complete search history.

(56) References Cited

U.S. PATENT DOCUMENTS

| | | | | |
|---|---|---|---|---|
| 3,952,304 | A * | 4/1976 | Broniwitz et al. | 342/95 |
| 6,441,743 | B1 * | 8/2002 | Berger | 340/603 |
| 6,442,166 | B1 * | 8/2002 | McDonald et al. | 370/395.42 |
| 6,904,390 | B2 * | 6/2005 | Nikitin et al. | 702/188 |
| 7,006,838 | B2 * | 2/2006 | Diener et al. | 455/456.1 |
| 2003/0076065 | A1 * | 4/2003 | Shafer et al. | 318/567 |
| 2006/0198352 | A1 * | 9/2006 | Bruck et al. | 370/347 |

OTHER PUBLICATIONS

Tian et al., "Smooth Exponential Stabilization of Nonholonomic Systems via time-varying feedback", Dec. 2000, IEEE, pp. 1912-1917.*

Xu et al., "Blind Channel Estimation in Aperiodic Time-Hopping Ultra-Wideband Communications", Jun. 2006, IEEE, pp. 2333-2346.*

* cited by examiner

*Primary Examiner*—Michael P. Nghiem
*Assistant Examiner*—Cindy D Khuu
(74) *Attorney, Agent, or Firm*—A J Park

(57) ABSTRACT

A computer program for performing a method of providing a parameter estimate from noisy data with aperiodic data arrival. The parameter of the measurement is estimated as a numerator divided by the denominator. The method involves setting a fixed time interval and then waiting for the time interval to expire or for a measurement to occur. If a measurement occurs before the time interval expires the numerator is estimated as a previous numerator plus the new measurement, and the denominator is estimated as a previous denominator plus one. Regardless of whether the measurement occurs or the time interval expires the numerator is estimated as a previous numerator times a step size and the denominator is estimated as a previous denominator times a step size. The method can be applied to numerous applications including assessing data temperature and predicting I/O response times.

17 Claims, 5 Drawing Sheets

FIG. 5

| Time | Next Aperiodic Measurement Time | Alarm? | Aperiodic Measurement? | Measurement? | True Value | Measurement Value | u | v | Smoothed Estimate | Staleness |
|---|---|---|---|---|---|---|---|---|---|---|
| 0 | | | | TRUE | 0 | -0.194865601 | -0.1364 | 0.7 | -0.194866 | 1.428571 |
| 0.276 | 0.276195603 | FALSE | TRUE | TRUE | 0.0552 | 0.208179334 | 0.0502 | 1.19 | 0.0422197 | 0.840336 |
| 1.276 | 1.58600356 | TRUE | FALSE | FALSE | 0.2525 | #N/A | 0.0352 | 0.833 | 0.0422197 | 1.20048 |
| 1.586 | 1.58600356 | FALSE | TRUE | TRUE | 0.3119 | 0.288614587 | 0.2266 | 1.2831 | 0.1766413 | 0.779362 |
| 2.586 | 3.018356086 | TRUE | FALSE | FALSE | 0.4944 | #N/A | 0.1587 | 0.8982 | 0.1766413 | 1.113375 |
| 3.018 | 3.018356086 | FALSE | TRUE | TRUE | 0.5677 | 0.732163449 | 0.6236 | 1.3287 | 0.4693033 | 0.752605 |
| 4.018 | 4.018398385 | TRUE | FALSE | FALSE | 0.7199 | #N/A | 0.4365 | 0.9301 | 0.4693033 | 1.075149 |
| 4.018 | 4.018398385 | FALSE | TRUE | TRUE | 0.7199 | 0.304799257 | 0.5189 | 1.3511 | 0.3840726 | 0.740153 |
| 5.018 | 5.133100554 | TRUE | FALSE | FALSE | 0.8435 | #N/A | 0.3632 | 0.9458 | 0.3840726 | 1.057361 |
| 5.133 | 5.133100554 | FALSE | TRUE | TRUE | 0.8556 | 1.243237915 | 1.1245 | 1.362 | 0.8256324 | 0.734201 |
| 6.133 | 7.312198216 | TRUE | FALSE | FALSE | 0.9414 | #N/A | 0.7872 | 0.9534 | 0.8256324 | 1.048858 |
| 7.133 | 7.312198216 | TRUE | FALSE | FALSE | 0.9896 | #N/A | 0.551 | 0.6674 | 0.8256324 | 1.498369 |
| 7.312 | 7.312198216 | FALSE | TRUE | TRUE | 0.9941 | 0.805895907 | 0.9498 | 1.1672 | 0.8137957 | 0.85677 |
| 7.704 | 7.703758316 | FALSE | TRUE | TRUE | 0.9995 | 0.830345451 | 1.2461 | 1.517 | 0.8214322 | 0.659186 |
| 8.704 | 9.135730156 | FALSE | FALSE | FALSE | 0.9856 | #N/A | 0.8723 | 1.0619 | 0.8214322 | 0.941694 |
| 9.136 | 9.135730156 | TRUE | TRUE | TRUE | 0.9673 | 0.762043343 | 1.144 | 1.4433 | 0.7926295 | 0.692837 |
| 9.805 | 9.804848491 | FALSE | TRUE | TRUE | 0.9248 | 0.820988388 | 1.3755 | 1.7103 | 0.8042361 | 0.58468 |
| 10.54 | 10.54320445 | FALSE | TRUE | TRUE | 0.8588 | 0.734240679 | 1.4768 | 1.8972 | 0.7784107 | 0.527082 |
| 11.12 | 11.11950423 | FALSE | TRUE | TRUE | 0.7942 | 0.550271193 | 1.419 | 2.0281 | 0.6996669 | 0.493081 |
| 12.12 | 13.26784872 | TRUE | FALSE | FALSE | 0.6576 | #N/A | 0.9933 | 1.4196 | 0.6996669 | 0.704401 |
| 13.12 | 13.26784872 | TRUE | FALSE | FALSE | 0.4949 | #N/A | 0.6953 | 0.9938 | 0.6996669 | 1.006287 |
| 13.27 | 13.26784872 | FALSE | TRUE | TRUE | 0.4689 | 0.545907462 | 0.8688 | 1.3956 | 0.6225463 | 0.716524 |
| 14.21 | 14.21041982 | FALSE | TRUE | TRUE | 0.2951 | 0.224506974 | 0.7653 | 1.6769 | 0.4563938 | 0.596325 |

# EXPONENTIAL SMOOTHING OF APERIODICALLY MEASURED VALUES WITH STALENESS REPORTING

BACKGROUND

Estimates of a time varying parameters are often required from a plurality of noisy measurements of that parameter. A standard technique for providing these estimates is called exponential smoothing. Exponential smoothing is essentially a simple average that weights recent measurements more heavily than earlier measurements. An estimate of the parameter is adjusted towards each new measurement according to the equation:

$$k_i = a\, x_i + (1-a)k_{i-1}$$

In the above equation $k_i$ is the new estimate, $k_{i-1}$ is the current estimate and $x_i$ is the measurement.

The configurable step size a controls the size of the adjustment. Exponential smoothing is used in a wide range of applications.

A disadvantage with the exponential smoothing technique arises when measurements do not occur at fixed intervals. The above exponential smoothing technique does not provide any way of discounting old measurements or give any indication of the age of measurements that could be used for controlling old measurements.

One simple technique for discounting old measurements is discounting on the basis of how many measurements have been received after the measurement in question. The assumption with this technique is that measurements are received on a regular or semi-regular basis. For example, if there are two physical clusters, one of which receives I/Os more frequently than the other, the smoothed measurement of the response time of the frequently accessed cluster will react more quickly to changes in the measured parameter than the infrequently accessed cluster. If left uncorrected these changes cause unpredictability.

Another disadvantage is that the smoothing equation given above requires an initial estimate of the parameter before the algorithm is run. After this initial estimate exponential smoothing proceeds as if the estimate were as accurate as the smoothed average of many measurements. The exponential smoothing relies on the assumption that the estimate is accurate. This assumption is unrealistic in situations where system architects have little or no prior knowledge of the parameter being measured.

SUMMARY

Described below is a computer program stored on tangible storage media for performing a method of providing a parameter estimate from noisy data with aperiodic data arrival. One technique described below involves setting a fixed time interval and then waiting for the time interval to expire or for a measurement to occur. If a measurement occurs before the time interval expires a numerator is estimated as a previous numerator plus the new measurement and the denominator is estimated as a previous denominator plus one. Regardless of whether the measurement occurs or the time interval expires the numerator is estimated as a previous numerator times a step size and the denominator is estimated as a previous denominator times a step size. A measurement is estimated from the denominator. A parameter of the measurement is estimated as a numerator divided by the denominator. The method can be applied to many different applications including assessing data temperature and predicting I/O response times.

BRIEF DESCRIPTION OF DRAWINGS

FIG. 5 is a table illustrating measurements and the working of the technique of the present invention.

DETAILED DESCRIPTION

Figure 1:
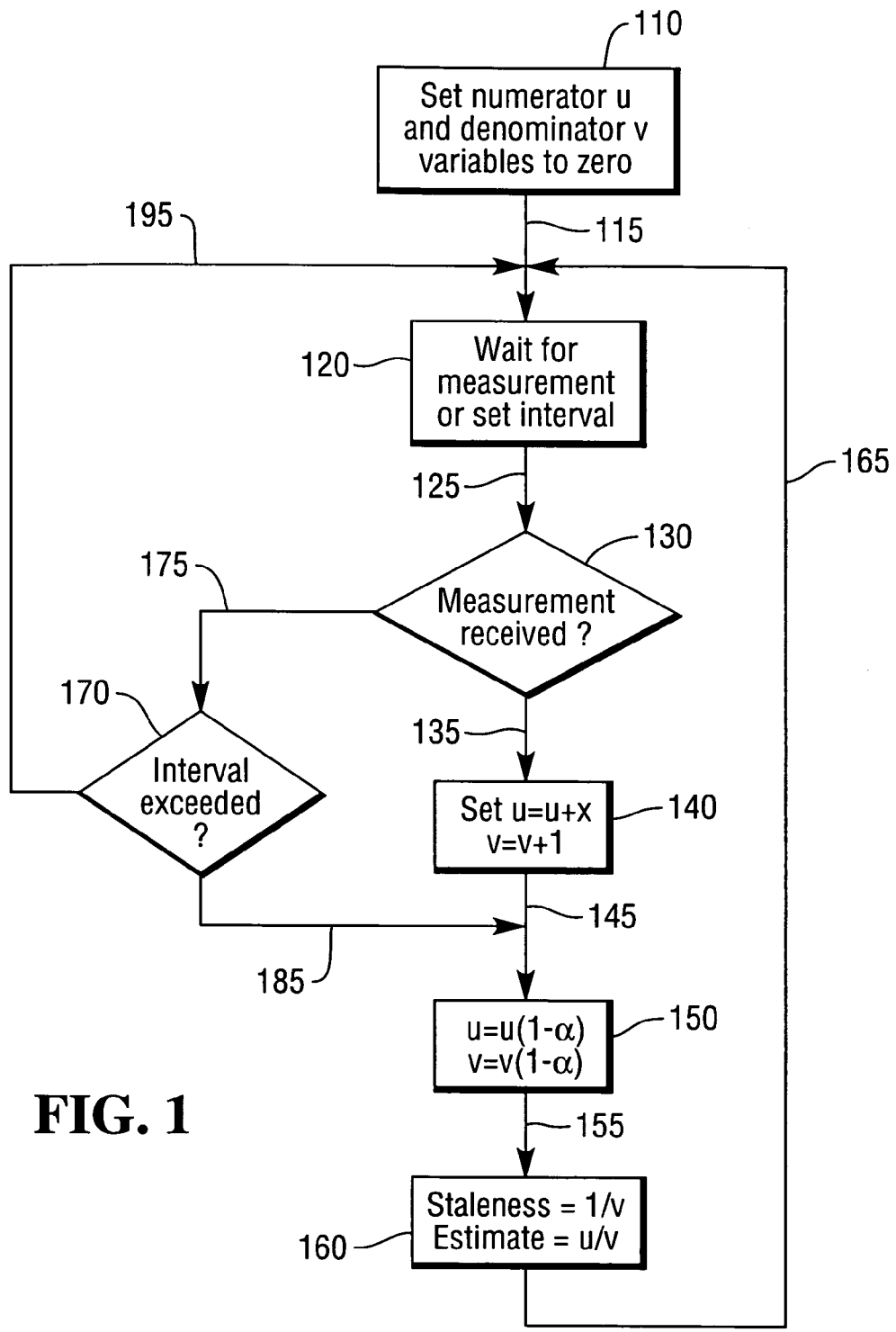
FIG. 1 is a flowchart of a technique of the invention.

FIG. 1 is a flow chart showing the logical flow of the computer program. Initially a numerator (u) and a denominator (v) variable are set to zero (step 110). A staleness threshold can also be set. The staleness value is the inverse of the denominator, staleness=1/v. Setting the denominator variable to zero sets the initial staleness to an infinite value. An initial infinite staleness is appropriate if no prior estimate of the parameter being measured is available. If the staleness is infinite, then any estimate of the parameter cannot be accepted as being up to date.

Staleness ranges from just above 0 to infinity. A staleness value just above zero is extremely fresh whereas an infinite staleness value is the stalest. A staleness value of zero can only occur if there are an infinite number of measurements. The staleness value produced by the algorithm can be compared to a configurable staleness threshold to decide whether some action should be taken. Actions include ignoring the estimate and causing a measurement to be taken. For example, when the staleness value of physical cluster exceeds the threshold, the physical cluster may be removed from consideration for migration and probe I/Os may be issued to measure the response time of the cluster and reduce the staleness value.

If a prior estimate is available of the parameter being measured, the staleness value can be set in accordance of confidence in the parameter estimate. For example, if a prior estimate is available and there is confidence in the accuracy of the estimate, then the staleness value can be set to a high value. If a prior estimate is available for the parameter being measured, then after the staleness value is set, the numerator is set as the denominator multiplied by the estimate of the parameter.

The staleness threshold is set by a user. Alternatively the staleness threshold can be set indirectly. In setting the staleness threshold indirectly, users of the method can consider how long the parameter should remain fresh between measurements. The hypothetical situation used to set the staleness threshold according to this rationale is a parameter that had infinite staleness (v=0) until the moment a measurement arrived. The staleness period is measured from this moment in time. The staleness period is set according to the equation:

$$\text{staleness threshold} = (1-a)^t$$

In this formula, $$t = (\text{staleness period})/(\text{alarm period})$$

The staleness period is the maximum time allowed between measurements. If the staleness period is exceeded a measurement is triggered. The alarm period denotes how frequently the staleness value is updated in the absence of a measurement. This formula will always create a staleness threshold between 0 and 1. In general the staleness threshold can range between 0 and infinity. The disparity between the staleness threshold set by the formula and the general staleness threshold is due to the assumption that the staleness period is measured on a hypothetical parameter the staleness of which was 0 before the measurement that began the staleness period.

The staleness threshold formula is derived as follows. At the beginning of the time period in which the final measurement of the parameter occurred, v was set to 0. After the measurement occurred v was incremented to 1. In each successive time period v as multiplied by (1-a) but was not incremented because no more measurements were made. The parameter v would have been multiplied by the (1-a) factor $t=$(staleness period)/(alarm period)

times so the staleness of the parameter after the full staleness period elapsed would be $(1-a)^t$.

The program waits until a set interval expires or a measurement (x) is received (step 120). The interval (alarm period) can be set by a user and provides a time period where if no measurement is received then the staleness of the present measurement or estimate is updated. In some alternatives if no measurement is received within the fixed interval, a command can be issued that results in a measurement.

When a measurement is received, the numerator is set to the previous numerator+the measurement $u=u+x$ The denominator is set to the previous denominator+1

$v=v+1$ (step 140).

After the numerator and denominator have been updated, or if the interval is exceeded then the numerator is updated to the previous numerator times (1-the step size), $u=u(1-a))$ and the denominator is updated to the previous denominator times (1-the step size), $v=v(1-a)$ (step 150).

The step size a is chosen as a value between 0 and 1. The closer the step size is to 1 the more confidence is put in the current measurement. The closer the step size is to 0 the more confidence is put in previous measurements. A typical value of the step size is 0.3.

Staleness can be measured by (1/denominator) (1/v) and an estimate of the measurement can be given as (the numerator/the denominator) (u/v) (step 160). After the staleness and the estimate have been updated then the algorithm results waiting for either a new measurement or a time interval to expire (step 120). The algorithm can report the staleness and the estimate at any time. The estimate provides the best guess as to what the measurement is and the staleness provides an estimate of the accuracy of the estimate. If the staleness value exceeds the staleness threshold a measurement can be triggered.

An alternative measure to staleness is freshness. The freshness value is the denominator (v).

If measurement occur at the same fixed interval as the set interval and confidence in the initial estimate leads to an initial staleness value of $v=(1-a)/a$ then the method is identical to traditional exponential smoothing.

Figure 2:
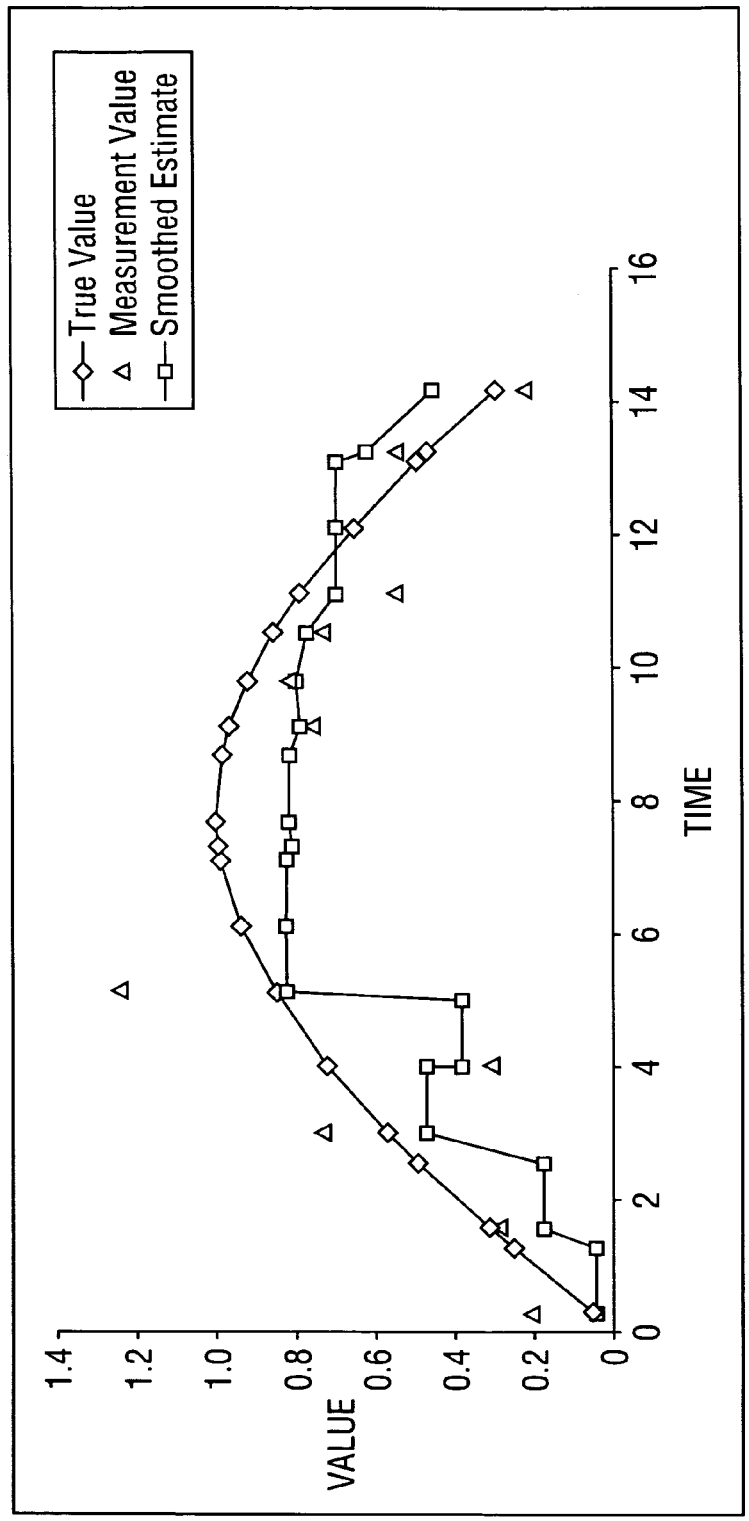
FIG. 2 is a graph of an example of noisy measurements.

FIG. 2 is a graph of an example of exponential smoothing with staleness reporting applied to noisy measurements. The measurements indicated by the diamonds show the true values. The actual measured values are those shown by the triangles. As can be seen in FIG. 2 the measured values arrive aperiodically. The table of FIG. 5 shows the measurements and the working of the algorithm. In this example the staleness threshold is 1.5 and the alarm period is 1. In the first line of the table of FIG. 5 at time 0 a measurement is issued. The true value is zero so the measurement value is the same as the measurement error and provides an initial estimate. In the second line at time 0.2762 a measurement arrives. The measurement is processed and used to update the numerator and denominator and provide a new smoothed estimate. The smoothed estimate has a lower staleness value than the previous estimate. At time 1.2762 a second has passed since the previous measurement arrived and an alarm is sounded. There is no aperiodic measurement but the staleness threshold is also not exceeded so no measurement is issued. In this line both the numerator and denominator of the equation updated and the staleness value increases. The staleness value is not enough to exceed the staleness threshold. At time 1.586 an aperiodic measurement is received. The measurement is processed and this leads to a decrease in the staleness value. As can be seen from table, the measurement interval is set to 1 so if no measurement is received within that time, the numerator and denominator of the equation are updated. The smooth estimate remains the same as the previous estimate but the staleness value increases.

Figure 3:
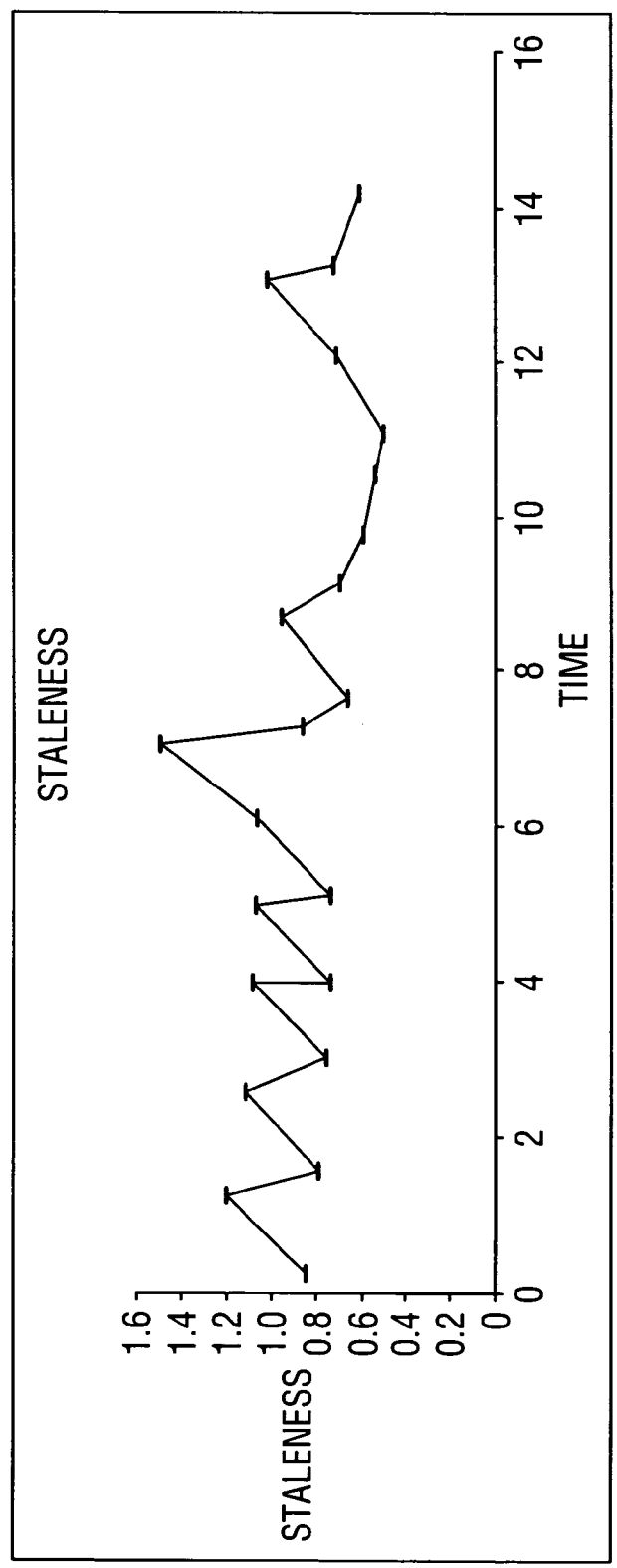
FIG. 3 is a graph showing the staleness of the measurements in FIG. 2.

FIG. 3 shows a plot of the staleness values for the example given in FIG. 2. FIG. 3 shows that every time that the user set interval expires without an aperiodic measurement being received, the staleness value increases. FIG. 3 shows that as the time between measurements increases the staleness of previous measurements increases. If the staleness exceeds a threshold value a measurement can be triggered. In intervals where a measurement is received then the staleness value decreases. In the example shown in FIG. 2 and FIG. 3 the alarm period is set at 1 and step size is set at 0.3. The staleness threshold is set at 1.5. If the staleness threshold is exceeded without a measurement being received then a measurement is issued.

Aperiodic exponential smoothing with staleness reporting can be applied to measuring or forecasting any quantity that satisfies three conditions. The first condition is that the quantity changes with time. The second condition is that aperiodic measurements of the quantity are occasionally received. The third condition is that there is the ability to initiate measurements of the quantity. The self initiated measurements may have some cost.

Examples of applications of the invention includes network routing. The network could either be a data network such as the internet or physical transport network such as a network of roads. With any network there are a number of paths for traffic from a source to a destination. The task of routing traffic along the network requires knowing or producing estimates of travel times along various paths of the network. The goal of routing is to send traffic from the source to the destination in the shortest time possible. Estimates of travel times along paths of the network arrive aperiodically, for example from packet arrival times on a data network, or a transport network from publicly available reports or radio communication from employees. Although estimates are provided by previously made traffic routing decisions, routing is usually done without the express purpose of measurement.

Thus, from the point of view of measurement, the arriving estimates are out of control of the router. The present invention can be applied to estimate traffic times along paths and provide estimates of when travel time along a path has become stale. When an estimated travel time along the path has become stale, the decision can be made to route the packet of data or physical vehicle along the path to measure the travel time along it.

As an alternative, the invention can be provided to military surveillance. For example a military target may be monitored by a satellite camera but only when the weather is clear. If the satellite is unable to view the target for several days due to cloudy weather, the military may send a low flying plane over the target to compensate for the lack of satellite information. The military may use the invention to estimate some scale of quantity, for example the number of personnel at the target, and decide when supplement satellite imagery with other more dangerous and expensive surveillance techniques.

A third application is a website that compiles reviews of a product or service whose quantity may change over time. One example is reviewing restaurants. Most of the reviews hosted by the website are provided at no cost to the visitors to the website. Some reviews are written by website employees. The website requires accurate and up to date reviews. The website could use the invention to estimate the current quality of the restaurant based on previous reviews and decide when to send a paid employee to a restaurant that hasn't been reviewed for a while.

Figure 4:
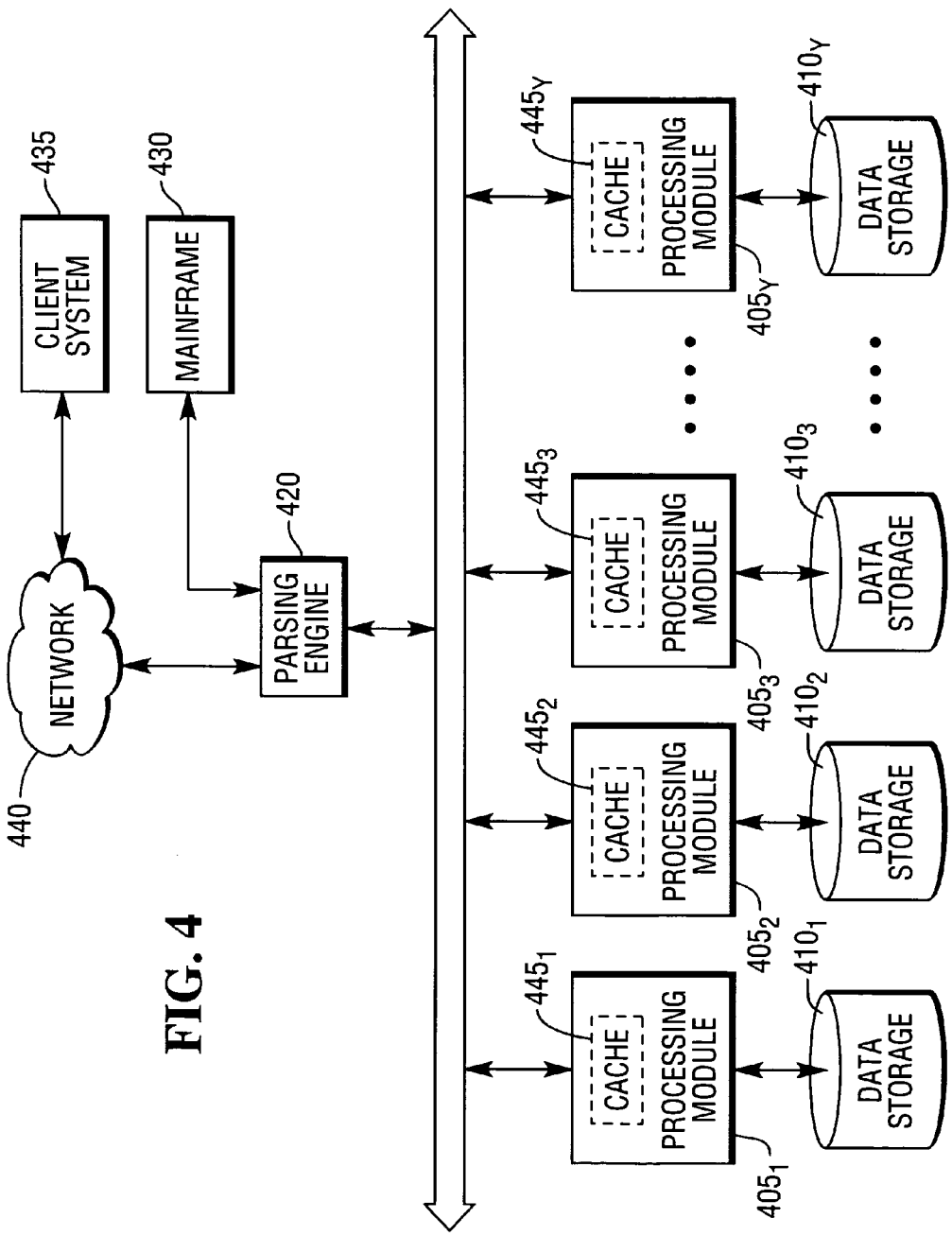
FIG. 4 is a block diagram of an exemplary large computer system on which the techniques described below are implemented.

FIG. 4 shows an example of one type of computer system in which the above techniques of exponential smoothing with staleness reporting is implemented. The computer system is a data warehousing system 400, such as a TERADATA data warehousing system sold by NCR Corporation, in which vast amounts of data are stored on many disk-storage facilities that are managed by many processing units. In this example, the data warehouse 400 includes a relational database management system (RDBMS) built upon a massively parallel processing (MPP) platform. Other types of database systems, such as object-relational database management systems (OR-DBMS) or those built on symmetric multi-processing (SMP) platforms, are also suited for use here.

As shown here, the data warehouse 400 includes one or more processing modules $405_{1 \ldots y}$ that manage the storage and retrieval of data in data-storage facilities $410_{1 \ldots y}$. Each of the processing modules $405_{1 \ldots y}$ manages a portion of a database that is stored in one of the corresponding data-storage facilities $410_{1 \ldots y}$. Each of the data-storage facilities $410_{1 \ldots y}$ includes one or more disk drives. The processing modules manage measurement and prediction of I/O size and response times.

A parsing engine 420 organizes the storage of data and the distribution of data objects stored in the disk drives among the processing modules $405_{1 \ldots y}$. The parsing engine 420 also coordinates the retrieval of data from the data storage facilities $410_{1 \ldots y}$ in response to queries received from a user at a mainframe 430 or a client computer 435 through a wired or wireless network 440. A data cache $445_{1 \ldots y}$ managed is stored in the memory of the processing modules $405_{1 \ldots y}$. The parsing engine contains the program described above for predicting the response time of the data storage devices. The parsing engine can use the program described above to smooth and predict the response times of I/Os on a per physical cluster basis. The parsing engine can also use the program to issue dummy or "probe" I/Os when no data arrives in a staleness period. Alternatively the program is run in each processing module.

The text above describes one or more specific embodiments of a broader invention. The invention also is carried out in a variety of alternative embodiments and thus is not limited to those described here. Those other embodiments are also within the scope of the following claims.

What is claimed is:

1. A computer-readable medium having a computer program stored thereon comprising executable instructions for performing an aperiodic noisy measurement method comprising:
    setting a fixed time interval;
    waiting for the time interval to expire or for a noisy measurement to occur;
    when the noisy measurement occurs, calculating a first numerator as a numerator of a previous noisy measurement plus the noisy measurement and calculating a first denominator as a denominator of the previous noisy measurement plus one;
    calculating a second numerator as the first numerator times a step size and calculating a second denominator as the first denominator times the step size;
    estimating a staleness measurement from the second denominator; and
    calculating an estimate of the noisy measurement as the second numerator divided by the second denominator.

2. The computer-readable medium of claim 1 further comprising executable instructions for discarding the estimate when the staleness measurement exceeds a threshold.

3. The computer-readable medium of claim 1 further comprising executable instructions for causing measurements to be taken when the staleness measurement exceeds a threshold.

4. The computer-readable medium of claim 1 further comprising executable instructions for setting an initial value of the staleness measurement as infinite when no prior estimate of the measurement is available.

5. The computer-readable medium of claim 1 further comprising executable instructions for setting the numerator and denominator in accordance with a parameter of an available measurement.

6. The computer-readable medium of claim 5 further comprising executable instructions for setting the second denominator according to a confidence in the estimate and setting the second numerator as the second denominator times the estimate.

7. The computer-readable medium of claim 1 further comprising executable instructions for setting a staleness threshold according to $(1-\alpha)^{\tau}$ where $\tau$ is a quotient of a staleness period and an alarm period and $\alpha$ is the step size.

8. The computer-readable medium of claim 1 wherein the staleness measurement is estimated as the inverse of the second denominator.

9. A computer-readable medium having a computer program stored thereon comprising executable instructions for aperiodically estimating a temperature comprising:
    setting a time interval;
    waiting for the time interval to expire or for a measurement of temperature to occur;
    when the measurement of temperature occurs, calculating a first numerator as a numerator of a previous temperature measurement plus the temperature measurement and calculating a first denominator as a denominator of the previous temperature measurement plus one;
    calculating a second numerator as the first numerator times a step size and calculating a second denominator as the first denominator times the step size;

estimating a staleness measurement from the second denominator; and calculating an estimate of the temperature as the second numerator divided by the second denominator.

10. The computer-readable medium of claim 9 further comprising executable instructions for discarding the estimate when the staleness measurement exceeds a threshold.

11. The computer-readable medium of claim 9 further comprising executable instructions for causing measurements to be taken when the staleness measurement exceeds a threshold.

12. The computer-readable medium of claim 9 further comprising executable instructions for setting an initial value of the staleness measurement as infinite when no prior estimate of the measurement is available.

13. The computer-readable medium of claim 9 further comprising executable instructions for setting the first numerator and the first denominator in accordance with a parameter of an available measurement.

14. The computer-readable medium of claim 13 further comprising executable instructions for setting the second denominator according to a confidence in the estimate and setting the second numerator as the denominator times the estimate.

15. The computer-readable medium of claim 9 further comprising executable instructions for setting a staleness threshold according to $(1-\alpha)^\tau$ where $\tau$ is a quotient of a staleness period and an alarm period and $\alpha$ is the step size.

16. The computer-readable medium of claim 9 wherein the staleness measurement is estimated as the inverse of the second denominator.

17. A computer-readable medium having a computer program stored thereon comprising executable instructions for aperiodically predicting I/O response times comprising:

setting a fixed time interval;

waiting for the time interval to expire or for an I/O response time measurement to occur;

when the I/O response time measurement occurs, calculating a first numerator as a numerator of a previous I/O response time measurement plus the I/O response time measurement and calculating a first denominator as a denominator of the previous I/O response time measurement plus one;

calculating a second numerator as the first numerator times a step size and calculating a second denominaotr as the first denominator times the step size;

estimating a staleness measurement from the second denominator; and calculating an estimate of the I/O measurement response time as the second numerator divided by the second denominator.

* * * * *